(12) United States Patent
Adams et al.

(10) Patent No.: US 8,463,855 B2
(45) Date of Patent: Jun. 11, 2013

(54) SYSTEM AND METHOD OF MESSAGE COMPRESSION

(75) Inventors: Neil P. Adams, Waterloo (CA); Michael S. Brown, Waterloo (CA); Herbert A. Little, Waterloo (CA)

(73) Assignee: Research In Motion Limited, Waterloo (CA)

( * ) Notice: Subject to any disclaimer, the term of this patent is extended or adjusted under 35 U.S.C. 154(b) by 781 days.

(21) Appl. No.: 11/556,718

(22) Filed: Nov. 6, 2006

(65) Prior Publication Data

US 2008/0109462 A1 May 8, 2008

(51) Int. Cl.
*G06F 15/16* (2006.01)

(52) U.S. Cl.
USPC ........... 709/206; 709/204; 709/231; 709/236; 719/313; 719/314; 705/51

(58) Field of Classification Search
USPC ................... 709/204–207; 719/313
See application file for complete search history.

(56) References Cited

U.S. PATENT DOCUMENTS

| | | | |
|---|---|---|---|
| 6,496,853 B1* | 12/2002 | Klein | 709/206 |
| 6,615,241 B1 | 9/2003 | Miller et al. | |
| 6,785,712 B1 | 8/2004 | Hogan et al. | |
| 7,003,724 B2 | 2/2006 | Newman | |
| 2002/0104026 A1 | 8/2002 | Barra et al. | |
| 2002/0116458 A1 | 8/2002 | Bricklin et al. | |
| 2004/0044735 A1* | 3/2004 | Hoblit | 709/206 |
| 2004/0148359 A1* | 7/2004 | Ahmed et al. | 709/207 |
| 2004/0172453 A1 | 9/2004 | De Mendonca et al. | |
| 2004/0221295 A1* | 11/2004 | Kawai et al. | 719/313 |
| 2005/0044081 A1* | 2/2005 | Ferguson et al. | 707/10 |
| 2006/0031574 A1 | 2/2006 | Simelius | |

FOREIGN PATENT DOCUMENTS

| | | |
|---|---|---|
| EP | 1718015 | 2/2006 |
| EP | 1689137 A | 8/2006 |
| EP | 1691516 A | 8/2006 |
| EP | 1718015 A | 11/2006 |
| EP | 1718015 A1 * | 11/2006 |
| WO | WO02/09339 | 1/2002 |
| WO | 2005013571 A | 2/2005 |

OTHER PUBLICATIONS

Liu Z et al: "Scalable, Robust, Efficient Dictionary-Based Compression (Scribe)" Internet Citation Jan. 18, 2002.
Examination Report dated Oct. 27, 2011 from EP10156656.0.

* cited by examiner

*Primary Examiner* — Ian N Moore
*Assistant Examiner* — Jackie Zuniga
(74) *Attorney, Agent, or Firm* — Jenna L. Wilson; Dimock Stratton LLP (57) ABSTRACT

A system and method for packaging electronic messages for delivery to a communication device is provided. Where the electronic message comprises at least one quoted parent message, the quoted parent message is identified by means of delimiters within the body of the electronic message, and the quoted message thus identified is replaced with an identifying instruction referring to an identifier corresponding to a previously received message comprising the quoted parent message. The edited electronic message is then transmitted to a recipient device, which uses the identifying instruction to reconstruct the original message by querying a data store using the identifier to locate a copy of the quoted parent message. If no quoted parent message is found, a request is issued by the recipient device to transmit a full version of the original electronic message.

28 Claims, 5 Drawing Sheets

SYSTEM AND METHOD OF MESSAGE COMPRESSION

BACKGROUND

1. Technical Field

This invention relates generally to the display of messages on, and delivery of messages to, mobile communication devices, and particularly to the display and delivery of messages constituting components of message threads on mobile communication devices.

2. Description of the Related Art

It is known in the art to compose e-mail messages that constitute replies to previously received messages and are typically addressed to the sender and/or other recipients of the previously received message. It is also known in the art to forward e-mail messages previously received to another e-mail address or recipient. Such e-mail messages that are created in reply or as a result of a previously received message are commonly known as "threaded" messages. A "thread" is a sequence of one or more related messages, which may be considered as analogous to a conversation among the e-mail correspondents. The relationship between the messages may be defined according to the subject line of the e-mail messages, or it may be defined according to identification data contained within the header of the e-mail messages.

A child message created in reply to a parent message, or created to forward a parent message, optionally attaches or includes the content and header of the parent message. According to the settings of the user's e-mail editing program, the parent message may be attached in accordance with Multipurpose Internet Mail Extensions (MIME) format, or its headers and content may be included ("quoted") within the body of the child message. Any new content added by the user composing the child message is often included at the beginning of the message, although a user may add new content anywhere in the body of the message. As a result, a child message in a lengthy thread may contain a brief amount of new content followed by several quoted parent messages, unless the author of the child message edits the message to remove some or all of the quoted parent messages. If a user is participating in a particularly lengthy thread, that user may receive and send a number of e-mail messages, each of which replicates the content of the parent messages received earlier. This results in the storage of redundant message content in multiple messages in the user's e-mail message files.

Further, some devices such as mobile communication devices that are used to receive and display electronic messages, such as e-mail messages, do not receive the entirety of an e-mail message at once; rather, they download new messages in segments or chunks in incremental fashion in order to conserve bandwidth usage. Only the first segment of a received e-mail message is therefore displayed to the mobile communication device user; if the user wishes to review more of the message, then a request is typically sent to the mail server, which then transmits the next segment or chunk of the message. In the situation where a received message is a child message in a thread, potentially the first segment of the message comprises not only the new content of the child message, but also the replicated content of the immediate parent message or messages. The content of the immediate parent message or messages, however, may be redundant in view of messages previously received on the mobile communication device; thus, the delivery of the parent message content is effectively an unwanted use of data bandwidth. However, while delivery of the parent message content in a child message may consume extra bandwidth, the user may still wish to be able to review the parent messages in order to gain some understanding of the context of the newly received child message content. Furthermore, if new messages are downloaded in segments or chunks, when a lengthy e-mail message (such as a child message) is to be received, the user may be required to make a number of requests to download further segments of the message in order to view the parent message for context.

Therefore, it is desirable to provide a system and method for receiving messages, such as e-mail messages, that reduce the incidence of downloading redundant parent message content while still providing context to a child message. It is further desirable to provide a system and method for receiving messages that are normally delivered in an incremental fashion in a manner that reduces the need for a user to make further requests for additional segments of a message in order to review the context of a child message.

BRIEF DESCRIPTION OF THE DRAWINGS

In drawings which illustrate by way of example only a preferred embodiment.

DETAILED DESCRIPTION

Figure 1:
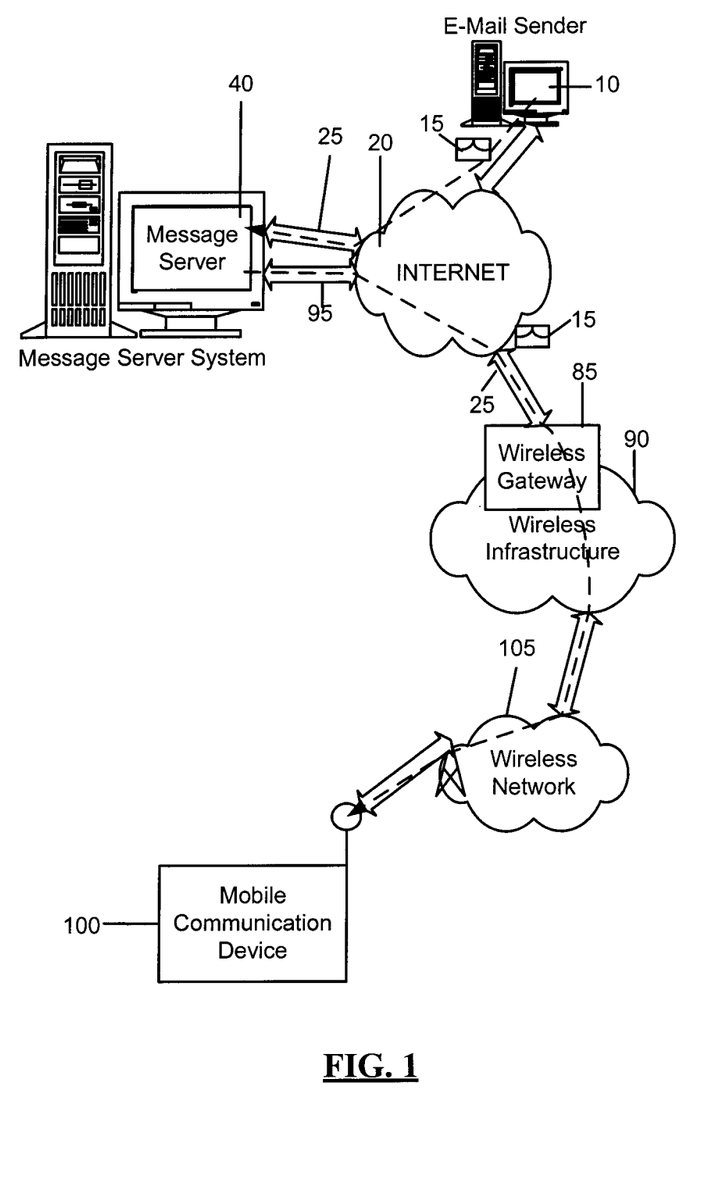
FIG. 1 is an overview of an example communication system in which a wireless communication device may be used.

FIG. 1 is an overview of an example communication system in which a wireless communication device may be used. One skilled in the art will appreciate that there may be other different topologies, but the system shown in FIG. 1 helps demonstrate the operation of the secure message processing systems and methods described in the present application. There may also be many message senders and recipients. The simple system shown in FIG. 1 is for illustrative purposes only.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as the AMERICA ONLINE® (AOL) service. Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are MICROSOFT® EXCHANGE™ and LOTUS DOMINO® products. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC 2822 (Request for Comment 2822 published by the Internet Society, "Internet Message Format"), headers and Multipurpose Internet Mail Extension (MIME) body parts to define the format of the mail message. These techniques are known to those skilled in the art. The message 15 arrives at the message server 40 and is normally stored in a message store. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric networks include the Mobitex™ Radio Network and the DataTAC™ Radio Network. Examples of older voice-centric data networks include Personal Communication Systems (PCS) networks like GSM, and TDMA systems.

Figure 2:
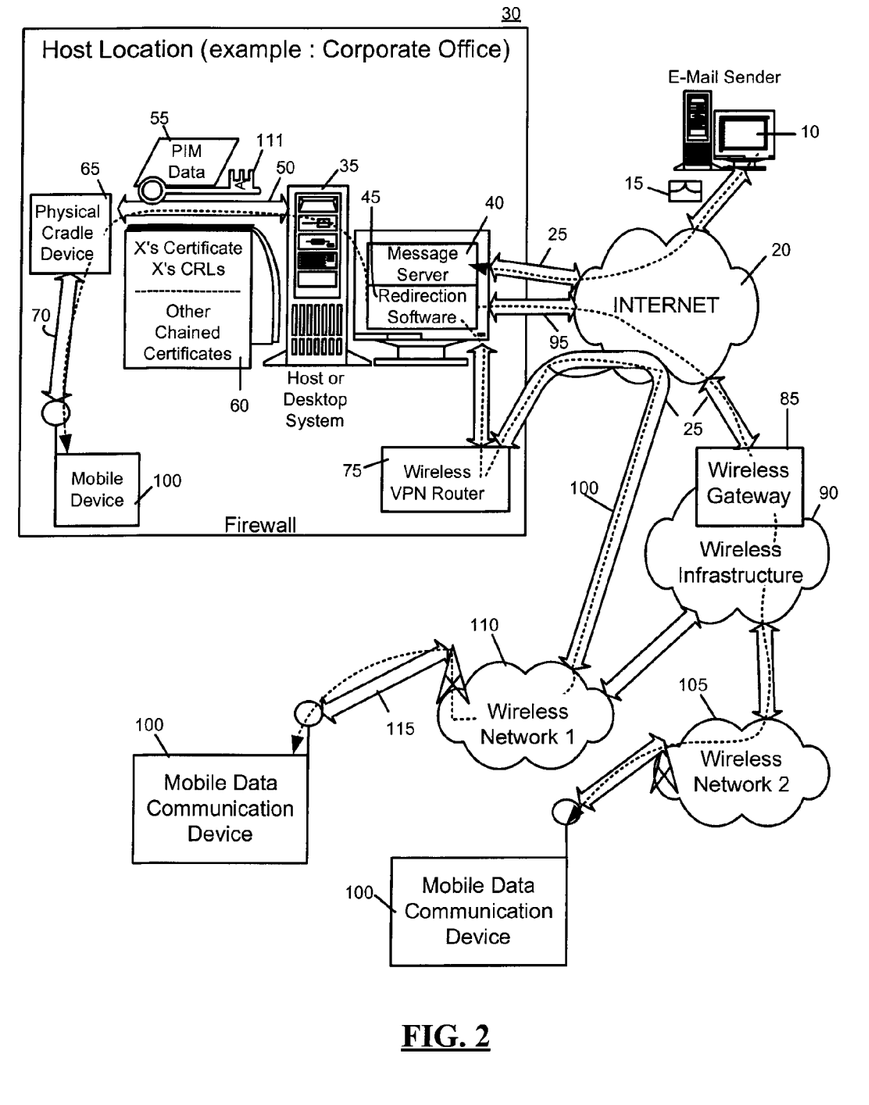
FIG. 2 is a block diagram of a further example communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on a computer within the firewall of the host system that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. An description of an example of the redirection software 45 may be found in the commonly assigned U.S. Pat. No. 6,219,694 ("the '694 Patent"), entitled "System and Method for Pushing Information From A Host System To A Mobile Data Communication Device Having A Shared Electronic Address", and issued to the assignee of the instant application on Apr. 17, 2001, which is hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. A VPN connection could be established directly through a specific wireless network 110 to a mobile device 100. The possibility of using a wireless VPN router 75 is contemplated to be used with Internet Protocol (IP) Version 6 (IPV6) on IP-based wireless networks. This protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place, possibly proprietary compression and encryption algorithm may be applied to the original message 15. In this way, messages being read on the mobile device 100 are no less secure than if they were read on a desktop workstation such as 35 within the firewall. The reply messages generated at the mobile device 100 may include a "from" field that reflects the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP (Pretty Good Privacy data encryption) specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
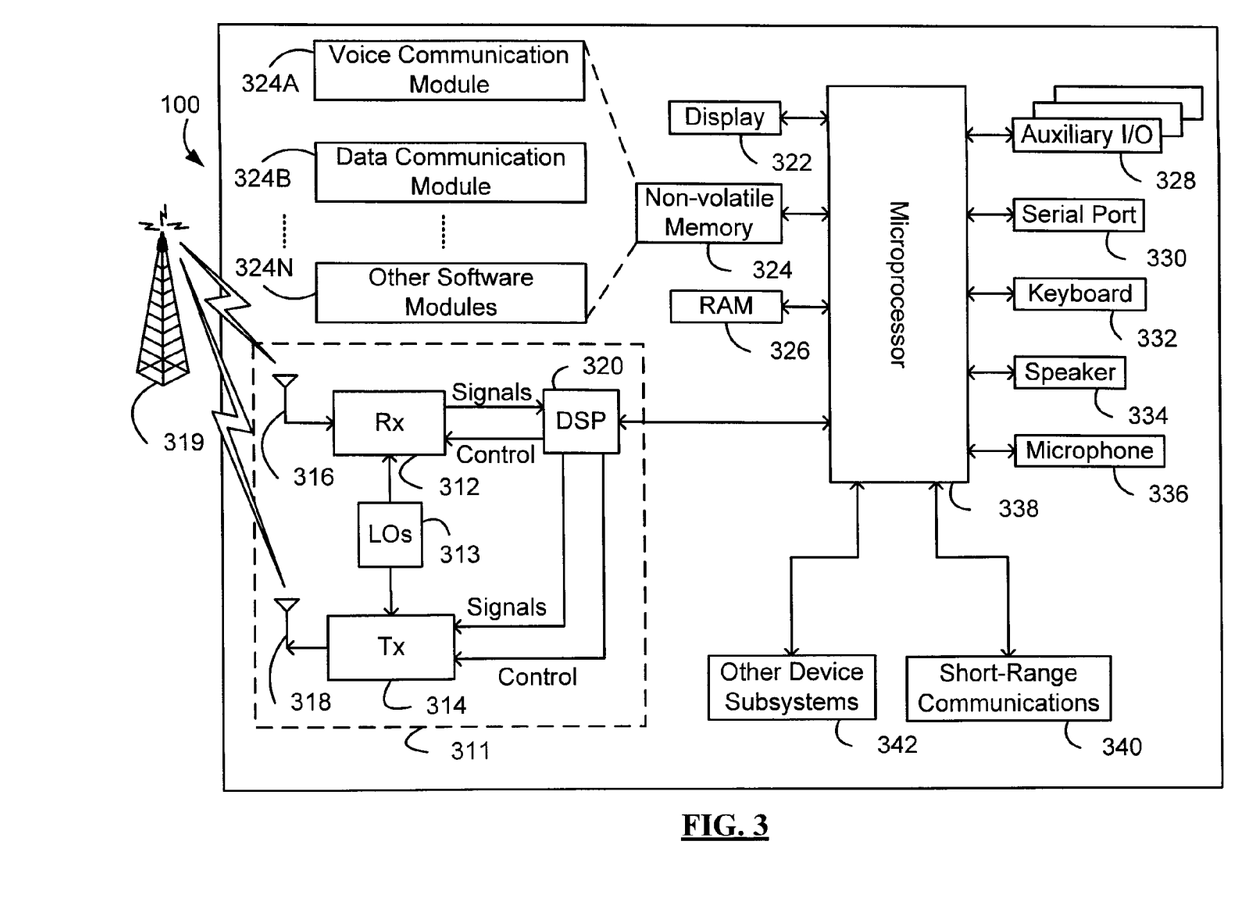
FIG. 3 is a block diagram of a wireless mobile device usable in the example communication system.

As another example, the systems and methods disclosed herein may be used with many different computers and devices, such as a wireless mobile communications device shown in FIG. 3. With reference to FIG. 3, the mobile device 100 is a dual-mode mobile device and includes a transceiver 311, a microprocessor 338, a display 322, non-volatile memory 324, random access memory (RAM) 326, one or more auxiliary input/output (I/O) devices 328, a serial port 330, an input device, such as a keyboard 332, a speaker 334, a microphone 336, a short-range wireless communications sub-system 340, and other device sub-systems 342.

The transceiver 311 includes a receiver 312, a transmitter 314, antennas 316 and 318, one or more local oscillators 313, and a digital signal processor (DSP) 320. The antennas 316 and 318 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 3 by the communication tower 319. These voice and data networks may be separate communication networks using separate infrastructure, such as base stations, network controllers, etc., or they may be integrated into a single wireless network.

The transceiver 311 is used to communicate with the network 319, and includes the receiver 312, the transmitter 314, the one or more local oscillators 313 and the DSP 320. The DSP 320 is used to send and receive signals to and from the transceivers 316 and 318, and also provides control information to the receiver 312 and the transmitter 314. If the voice and data communications occur at a single frequency, or closely-spaced sets of frequencies, then a single local oscillator 313 may be used in conjunction with the receiver 312 and the transmitter 314. Alternatively, if different frequencies are utilized for voice communications versus data communications for example, then a plurality of local oscillators 313 can be used to generate a plurality of frequencies corresponding to the voice and data networks 319. Information, which includes both voice and data information, is communicated to and from the transceiver 311 via a link between the DSP 320 and the microprocessor 338.

The detailed design of the transceiver 311, such as frequency band, component selection, power level, etc., will be dependent upon the communication network 319 in which the mobile device 100 is intended to operate. For example, a mobile device 100 intended to operate in a North American market may include a transceiver 311 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 319, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 319, other than any legally required operations, such as '911' emergency calling.

After any required network registration or activation procedures have been completed, the mobile device 100 may the send and receive communication signals, including both voice and data signals, over the networks 319. Signals received by the antenna 316 from the communication network 319 are routed to the receiver 312, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 320. In a similar manner, signals to be transmitted to the network 319 are processed, including modulation and encoding, for example, by the DSP 320 and are then provided to the transmitter 314 for digital to analog conversion, frequency up conversion, filtering, amplification and transmission to the communication network 319 via the antenna 318.

In addition to processing the communication signals, the DSP 320 also provides for transceiver control. For example, the gain levels applied to communication signals in the receiver 312 and the transmitter 314 may be adaptively controlled through automatic gain control algorithms implemented in the DSP 320. Other transceiver control algorithms could also be implemented in the DSP 320 in order to provide more sophisticated control of the transceiver 311.

The microprocessor 338 preferably manages and controls the overall operation of the mobile device 100. Many types of microprocessors or microcontrollers could be used here, or, alternatively, a single DSP 320 could be used to carry out the functions of the microprocessor 338. Low-level communication functions, including at least data and voice communications, are performed through the DSP 320 in the transceiver 311. Other, high-level communication applications, such as a voice communication application 324A, and a data communication application 324B may be stored in the non-volatile memory 324 for execution by the microprocessor 338. For example, the voice communication module 324A may provide a high-level user interface operable to transmit and receive voice calls between the mobile device 100 and a plurality of other voice or dual-mode devices via the network 319. Similarly, the data communication module 324B may provide a high-level user interface operable for sending and receiving data, such as e-mail messages, files, organizer information, short text messages, etc., between the mobile device 100 and a plurality of other data devices via the networks 319. The microprocessor 338 also interacts with other device subsystems, such as the display 322, the RAM 326, the auxiliary input/output (I/O) subsystems 328, the serial port 330, the keyboard 332, the speaker 334, the microphone 336, the short-range communications subsystem 340 and any other device subsystems generally designated as 342.

Some of the subsystems shown in FIG. 3 perform communication-related functions, whereas other subsystems may provide "resident" or on-device functions. Notably, some subsystems, such as the keyboard 332 and the display 322 may be used for both communication-related functions, such as entering a text message for transmission over a data communication network, and device-resident functions such as a calculator or task list or other PDA type functions.

Operating system software used by the microprocessor 338 is preferably stored in a persistent store such as non-volatile memory 324. The non-volatile memory 324 may be implemented, for example, as a Flash memory component, or as battery backed-up RAM. In addition to the operating system, which controls low-level functions of the mobile device 310, the non-volatile memory 324 includes a plurality of software modules 324A-324N that can be executed by the microprocessor 338 (and/or the DSP 320), including a voice communication module 324A, a data communication module 324B, and a plurality of other operational modules 324N for carrying out a plurality of other functions. These modules are executed by the microprocessor 338 and provide a high-level interface between a user and the mobile device 100. This interface typically includes a graphical component provided through the display 322, and an input/output component provided through the auxiliary I/O 328, keyboard 332, speaker 334, and microphone 336. The operating system, specific device applications or modules, or parts thereof, may be temporarily loaded into a volatile store, such as RAM 326 for faster operation. Moreover, received communication signals may also be temporarily stored to RAM 326, before permanently writing them to a file system located in a persistent store such as the Flash memory 324.

An exemplary application module 324N that may be loaded onto the mobile device 100 is a personal information manager (PIM) application providing PDA functionality, such as calendar events, appointments, and task items. This module 324N may also interact with the voice communication module 324A for managing phone calls, voice mails, etc., and may also interact with the data communication module for managing e-mail communications and other data transmissions. Alternatively, all of the functionality of the voice communication module 324A and the data communication module 324B may be integrated into the PIM module. Another exemplary application module 324N that may be loaded onto the mobile device 100 is an electronic message editor ("e-mail editor" or "e-mail editing application"), which provides editing and/or composition capabilities to enable the user to compose and edit electronic messages, such as e-mail. This module preferably interacts with the data communication module 324B for managing electronic message transmissions, and with the PIM.

The non-volatile memory 324 preferably also provides a file system to facilitate storage of PIM data items on the device. The PIM application preferably includes the ability to send and receive data items, either by itself, or in conjunction with the voice and data communication modules 324A, 324B, via the wireless networks 319. The PIM data items are preferably seamlessly integrated, synchronized and updated, via the wireless networks 319, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 326. Such information may instead be stored in the non-volatile memory 324, for example, when storage intervals are relatively short, such that the information is removed from memory soon after it is stored. However, storage of this information in the RAM 326 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 330 of the mobile device 100 to the serial port of a computer system or device. The serial port 330 may also be used to enable a user to set preferences through an external device or software application, or to download other application modules 324N for installation. This wired download path may be used to load an encryption key onto the device, which is a more secure method than exchanging encryption information via the wireless network 319. Interfaces for other wired download paths may be provided in the mobile device 100, in addition to or instead of the serial port 330. For example, a USB port would provide an interface to a similarly equipped personal computer.

Additional application modules 324N may be loaded onto the mobile device 100 through the networks 319, through an auxiliary I/O subsystem 328, through the serial port 330, through the short-range communications subsystem 340, or through any other suitable subsystem 342, and installed by a user in the non-volatile memory 324 or RAM 326. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 311 and provided to the microprocessor 338, which preferably further processes the received signal in multiple stages as described above, for eventual output to the display 322, or, alternatively, to an auxiliary I/O device 328. A user of mobile device 100 may also compose data items, such as e-mail messages, using the keyboard 332, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 328, which may include a thumbwheel input device, a touchpad, a variety of switches, a rocker input switch, etc. The composed data items input by the user may then be transmitted over the communication networks 319 via the transceiver module 311.

When the mobile device 100 is operating in a voice communication mode, the overall operation of the mobile device is substantially similar to the data mode, except that received signals are preferably be output to the speaker 334 and voice signals for transmission are generated by a microphone 336. Alternative voice or audio I/O subsystems, such as a voice message recording subsystem, may also be implemented on the mobile device 100. Although voice or audio signal output is preferably accomplished primarily through the speaker 334, the display 322 may also be used to provide an indication of the identity of a calling party, the duration of a voice call, or other voice call related information. For example, the microprocessor 338, in conjunction with the voice communication module and the operating system software, may detect the caller identification information of an incoming voice call and display it on the display 322.

A short-range communications subsystem 340 is also included in the mobile device 100. The subsystem 340 may include an infrared device and associated circuits and components, or a short-range RF communication module such as a BLUETOOTH® module or an 802.11 module, for example, to provide for communication with similarly-enabled systems and devices. Those skilled in the art will appreciate that "BLUETOOTH®" and "802.11" refer to sets of specifications, available from the Institute of Electrical and Electronics Engineers, relating to wireless personal area networks and wireless local area networks, respectively.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

In accordance with a preferred embodiment, a device configured to receive electronic messages, including e-mail messages, is provided. This device comprises a mobile communication device 100, but may also include other devices such as a personal computer or other communication device configured to receive electronic messages. The preferred embodiment will be described in relation to a mobile communication device 100 and a message server 40 configured to receive e-mail messages 15 and to deliver these messages to the mobile communication device 100.

The embodiments described in the following paragraphs describe the operation of the message server 40. Those skilled in the art will appreciate that the code, scripts, or other components necessary to carry out the method or implement the system described herein need not be configured as a portion of or resident on the message server 40. Rather, the system and method described below may be implemented on another server or computing device associated with the message server 40, or may be associated or combined with the redirector program 45. For ease of reference, however, the following description is provided in the context of a message server 40, but this description should not be taken to limit the embodiments to a system operating on the message server 40. Similarly, the functions described with reference to the mobile communication device 100 need not be restricted to the operation of a mobile communication device; the functions may equally be carried out on another computing and/or communication device, such as a personal computer or personal digital assistant. Whether a mobile communication device 100 or other computing or communication device is used, the functions of the device described herein may be implemented in a number ways that will be appreciated by those skilled in the art; for example, the functions may be implemented by means of a messaging or message viewing application resident in device memory and executed by a processor of the device, or by another compression/decompression application that may be resident in device memory and executed by a device processor that preferably cooperates with the messaging application or a message viewing application to allow the user to read and compose electronic messages. For ease of reference, the following description is provided in the context of a mobile communication device 100 and a mobile communication device 100 configured to implement the system and method thus described, but this description should not be taken to limit the embodiments to a mobile communication device 100 or a messaging application.

In the preferred embodiment, when the message server 40 receives an e-mail message 15 it stores the message, as received, in a message store. This message may be received from the mobile communication device 100, as a message intended for transmission over a network to a recipient, or it may be received for delivery to the mobile communication device 100. The message store may comprise a database or a flat file comprising a series of messages, or it may comprise any other suitably configured data store. While the message store may be located on the message server 40, it may be provided elsewhere on the network associated with the message server 40, in communication with the message server 40.

Figure 4:
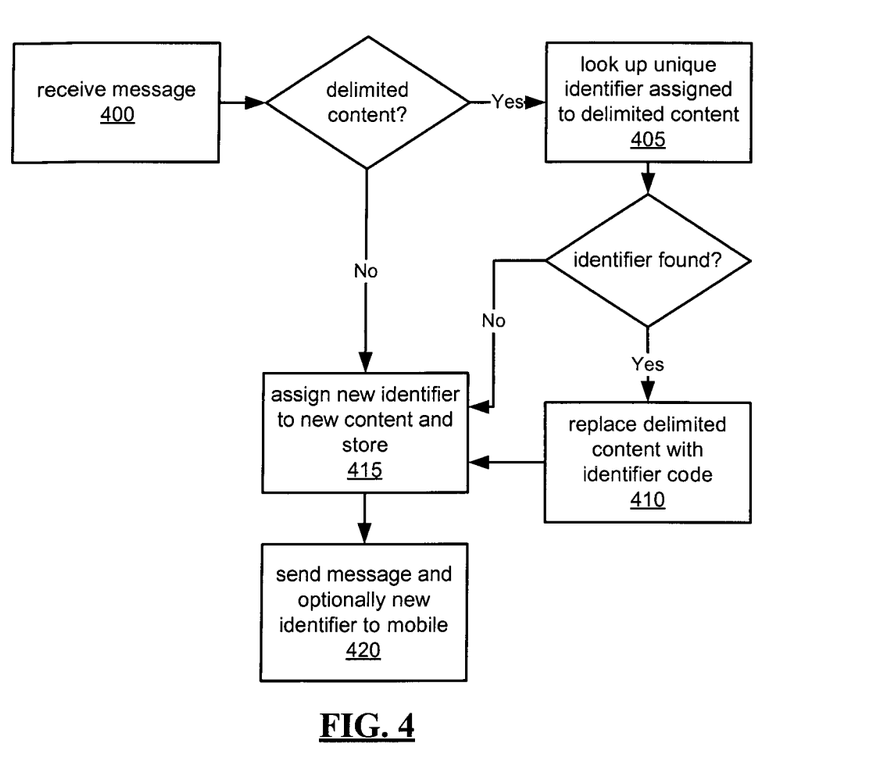
FIG. 4 is a flowchart of a method for receiving and compressing an electronic message for delivery to a mobile device of the preferred embodiment.

When e-mail messages 15 are received, preferably a redirection program 45 determines whether the message 15 is to be delivered to the mobile communication device 100. The system and method for compressing e-mail messages 15, as described below, is preferably directed towards the delivery of messages to the mobile communication device 100, although it may also be implemented for the delivery of messages to another device. Regardless of whether a redirection program 45 is utilized, with reference to FIG. 4, once a message 15 is received at step 400 by the message server 40, and preferably stored in the message store, a process at the message server 40, which may be implemented by code such as an application module, scans the received message 15. The process preferably both indexes the main content of the message 15 and determines whether the message 15 comprises delimiters indicative of a quoted parent message, as indicated in FIG. 4.

It is known to employ different types of delimiters according to the format of the e-mail message 15 to indicate that the content following the delimiter was copied from a previously received message. While there is no mandatory standardized format for such delimiters, certain conventions are frequently followed. In this description, the "content" of an e-mail message comprises the portions of the message other than included header information, attached in accordance with RFC 2822 or other standards or conventions; the content may also include file attachments, preferably MIME encoded as is known in the art.

For example, when an e-mail message (also referred to here as the "child message" or, in the context of being received from a server, the "received message") is created to forward a previously received message (also referred to as a "parent" message) on to the recipient of the child message, or when the child message is created in reply to a parent message, the content of the child message often comprises the simple headers and the content of the parent message. Preferably, the headers and content of the parent message are appended after the "newer" content of the child message, that is to say, any content in the child message that is not a copy of a previously received message. The simple headers typically indicate the sender, recipient, subject, and timestamp of the parent message, often referred to as the "To:", "From:", "Subject:", and "Date:" or "Time:" fields. By convention, when a child message is composed in reply to a parent message to one or more recipients (which may include the sender of the parent message), the subject field of the child message may contain the default value comprising the subject line of the parent e-mail message, optionally preceded by the notation "Re:" or a similar notation to signify that the child message was composed in response to the parent e-mail. Also by convention, when a new child e-mail message is composed in order to forward a parent e-mail message to one or more recipients (which may include the sender of the parent message), the subject field of the child message by default may contain a default value comprising the subject line of the parent e-mail message, optionally preceded by the notation "Fwd:" or a similar notation to signify that the child message was composed to forward the parent e-mail message. If the child message is a further reply or a further forwarding of the parent e-mail message, the e-mail editing application may be configured to add a further "Re:" or "Fwd:" to the subject line. The e-mail editing program employed by the user creating a child message usually provides the user with the capability of editing the subject field if desired.

At least the content of the parent message comprised in the child message is typically delimited within the content of the child message using notation easily identifiably as a delimiter. For example, in a plaintext child message that comprises a parent message, the header and content of the parent message may be preceded in the content of the child message with the delimiter "----- Original Message -----". Alternatively, if the child message is created in rich text format (RTF) or hypertext markup language (HTML), a different delimiter, such as a series of underscore characters (e.g., "________" may precede the header and content of the parent message. As yet a further alternative, the delimiter in an HTML formatted message may comprise a graphic, such as a horizontal rule defined by a <hr> tag. The message server 40 and the mobile communication device 100 are preferably configured to recognize a wide range of possible delimiters, and are also preferably configured to be programmed to recognize other forms of delimiters as required.

The content of the parent message itself may be further delimited within the body of the child message. While the parent content may be left in its original format, the editing program may be configured to precede each line of the parent content with a token such as greater than sign (e.g., ">"), or a tab or space character; in the case of an HTML message, the content of the parent message may be contained within a grouping element, such as a <div> element, or within an HTML-defined table cell. By placing the content in such an element or cell, a message display program may be configured to display the content of the element or cell in a particular format that visually distinguishes the parent message content from the content of the child message. It will be appreciated by those skilled in the art that if a parent message was a child message itself, comprising the content of a previous parent message, then identifying delimiters and optionally tokens, will be incorporated into the content of the child message to designate the beginning of each parent message now comprised in the child message.

If the parent message is included in the child message as a file attachment rather than within the content of the child message, then the attachment comprising the parent message can be recognized by MIME encoding used to define the attachment. Such MIME encoding is known in the art.

A person composing a child message using an e-mail editing program or application on a computing device or other communication device, including a mobile communication device, may be provided by the program with the capability of editing the child message to remove some or all of the quoted parent message(s), or to alter the delimiter used to indicate the start of the quoted parent message(s). However, on many occasions, the person creating the child message leaves the quoted parent message(s) intact and merely inserts any new content at the beginning of the child message content, resulting in a lengthy child message. In such circumstances, particularly where the recipient of the child message is receiving the message on a device where bandwidth and download time is of any concern, such as a mobile communication device 100, it is desirable to reduce the amount of data required to be downloaded in order to display the child message on the mobile communication device 100.

The message server 40 and the mobile communication device 100 may be configured to employ a predetermined delimiter when messages 15 are received by the server 40 and redirected to the mobile communication device 100. Returning to FIG. 4, the message server 40 scans a received message 15 to determine whether it comprises delimited content as described above. If the received message 15 does not comprise any delimited content (for example, if the received message 15 does not contain any indicia indicating that a parent message was quoted or otherwise replicated within the body of the received message 15), then the message server 40 assigns an identifier to the received message 15 at step 415.

Preferably, the identifier is capable of uniquely identifying the received message 15 to the mobile communication device 100. It is not necessary that the identifier be absolutely unique to the message server 40, particularly since the message server 40 may store and forward messages for a plurality of users and a plurality of mobile communication devices. An identifier may comprise a hash of the content of the received message 15, which is calculable by the message server 40, and optionally by the mobile communication device 100. The hash may be calculated based on the actual message content, or on a collection of select header information and message content. The message server 40 stores a record associating the received message 15 with its hash, preferably in the message store, although the record associating the received message 15 with its hash may be stored elsewhere on the network associated with the message server 40. In the preferred embodiment, if the message is deleted from the message server 40, then the record correlating the hash or other identifier to the message is likewise deleted. If the received message 15 comprises more than one delimiter indicating the presence of more than one parent message contained within the received message, the message server 40 may compute a hash based on all of the parent message content in the received message 15, or only a portion of the parent messages, or on the "newer" content of the received message 15 that was not defined by delimiters as quoted content.

The identifier alternatively may be a header field value contained in the received message 15. For example, RFC 2822 defines optional "message-id", "in-reply-to", and "reference" fields in an e-mail message header. The message-id field contains a single unique message identifier, which is preferably unique to the host sending the message. The in-reply-to and reference fields of a newly created message are typically blank or non-existent if the newly created message is not part of a previously existing thread, or is the child of a parent message lacking a message-id field value. If the message-id, in-reply-to, and reference fields are used, then the in-reply-to field preferably contains the contents of the message-id field of the parent message. The references field of the child message will preferably contain the value of the message-id field, the value of the references field, and the value of the in-reply-to field, if any, of the parent message. If a child message has more than one parent message, then the child's in-reply-to field may contain the contents of all the parents' message-id fields. Thus, a suitable identifier includes the value of the message-id header field of the received message 15, if this field is provided with a value. Again preferably the message server 40 stores a record associating the received message 15 with its message-id value, preferably in the message store, or alternatively in another store accessible by the message server 40.

If the message server 40 determines that the received message 15 does comprise delimited content, then the message server 40 attempts to identify the delimited content against existing records in the message store at step 405. In the case where the message identifier is configured to be a hash of the message content, the message server 40 is configured to calculate a hash of the parent message replicated after the delimiter identifying the parent message within the content of the child message 15. If more than one delimiter is present in the received message 15, then preferably the hash is calculated only on the replicated parent message content between consecutive delimiters, as it is likely that each subsequent delimiter designates a further parent message quoted within the received message 15. The hash may be calculated based on the replicated headers and parent content found after the delimiter, or based on the parent content only, omitting the replicated headers, depending on how the message server 40 is configured.

The calculated hash is then compared against the records stored by the message server 40. If a match is found, then the message server 40 had previously received, and stored, the hashed parent message, and the system operates based on the assumption that the mobile communication device 100 likewise has previously received and stored the hashed parent message. The message server 40 then edits the received message 15 in preparation for delivery to the mobile communication device 100 by replacing each identified replicated parent message at step 410 with an identifying instruction, token, or code having a predetermined meaning for the mobile communication device 100, together with data identifying the hash value. An example of data identifying the hash value is "<INSERT quoted-parent value=E498CA225>", which comprises a command that is recognizable by a messaging application on the mobile communication device 100 and a value. Preferably, both the headers and content of the replicated parent message are replaced, although in another embodiment only the parent message content may be replaced. Preferably, this identifying instruction, token, or code is shorter than the replicated parent message it replaces. Where more than one parent message has been replicated within the content of the child message 15, there may be more than one identifying instruction or code inserted within the body of the child message.

In one embodiment, the message server 40 may incorporate an additional header field in the edited child message 15 intended for delivery to the mobile communication device 100, which indicates to a messaging application operating on the mobile communication device 100 upon receipt of the message 15 that there are identifying instructions within the content of the message.

It will be appreciated that this method of compressing the size of the message deliverable to the mobile communication device 100 requires that the message received at the message server 40 is stored in the clear at the message server 40; preferably, the message received is in plaintext and is not encrypted. If the message received at the message server 40 is encrypted, then the message server 40 must be capable of decrypting the message and storing a decrypted copy of the message content prior to transmitting the child message 15 to the mobile communication device 100. Thus, in one embodiment, the message server 40 may be configured to automatically compress only unencrypted messages deliverable to a mobile communication device 100 in the manner described above, and to not compress an encrypted message. In an alternate embodiment, the message server 40 is provided with the session key or other key, as will be known to those skilled in the art, that is required to decrypt an encrypted message so that the message server 40 can decrypt and compress the message before forwarding a compressed version of the message on to a mobile communication device 100. Before forwarding the compressed message, the message server 40 may re-encrypt the compressed message using the original session key or other key, or by using a new key provided that the mobile communication device 100 is capable of decrypting a message encrypted with the new key. However, messages received by the server 40 that are signed but not encrypted may be compressed in the manner described above, whether or not the message server 40 is configured to verify the digital signature. It will be appreciated from this description that if the user of the mobile communication device 100 wishes to verify the digital signature, such a verification typically requires a copy of the entire content of the signed message in order to perform the necessary hash or other computation based on the message content. Therefore, if the digital signature is to be verified at the mobile communication device 100, then all parts of the original message must be made available to the mobile communication device 100.

In another embodiment, the identifier may be derived from another value, such as the message-id value of the previously received message. In this embodiment, if it is determined by the message server 40 that the received message 15 comprises delimited content, the message server 40 examines the headers of the received message 15 for values in the in-reply-to and reference fields. If values for either or both these fields are present in the received message 15, then the message server 40 checks the message store for previous messages with message-ids matching these values. If such messages are found, then the content of these found messages are compared against each delimited replicated parent content in the received message 15. If a match is found, then the matched replicated parent content is replaced with the identifying instruction, token, or code comprising data identifying the matched found message's message-id value at step 410.

In a further embodiment, instead of relying on the in-reply-to and reference fields in the header, replicated parent messages can be matched against previously received messages by a string comparison. For each delimiter found in the content of the child message 15, the message server 40 could attempt to match the headers and a character string selected from the content of the replicated parent message against messages already stored in the message store for the message server 40. If a match is found, then the replicated parent message within the child message 15 would be replaced with the identifying instruction or code comprising the message-id value of the message found in the message store at step 410.

The newer content of the received message 15, or content of the received message 15 that does not comprise quoted content from a parent message, is preferably likewise hashed and its value stored in the message store at step 415. The message 15, which may have been edited at step 410, is then sent to the mobile communication device 100 at step 420. If the received message 15 did not contain any delimiters indicating the inclusion of any replicated parent messages, then step 410 is preferably bypassed, and the received message 15 itself is hashed then sent to the mobile communication device 100 at step 420. If the identifier of the newer content of the message 15 was defined by a hash, it is not necessary for the message server 40 to send both the edited message 15 and the hash value to the mobile communication device 100; the mobile communication device 100 is preferably configured to calculate the hash for the newer content 15, and to store this hash value in its own data store. However, the identifier associated with the newer content may be sent to the mobile communication device 100 as well as the edited message 15.

If the message 15 received by the message server 40 is received from the mobile communication device 100, that is, a message generated at the mobile device 100 intended for delivery to another party from the message server 40, the mobile communication device 100 preferably determines the identifier value itself, and stores this value in a data store as well as the message 15. The message server 40, upon receipt of the message 15 from the mobile communication device 100, likewise determines the identifier and stores the message as well, as described above.

If the message server 40 and the mobile communication device 100 are configured to reconcile their respective message stores with each other, so that the message stores resident on both the server 40 and the mobile device 100 are generally equal at any given time, then the message server 40 need not assume that the mobile communication device 100 likewise had previously stored the hashed parent message. Rather, the message server 40 can confirm, from its own records, whether or not the same hashed parent message is resident on the mobile communication device 100. If the message server 40 determines that the parent message is not stored on the mobile communication device 100, then the message server 40 does not replace the replicated parent message with the identifying instruction or code, but rather leaves the replicated parent message intact within the content of the child message 15 then delivers the child message 15 to the mobile communication device 100.

Preferably, the message server 40 also records in its message store or another data store that a compressed version of the message, edited as described above, was delivered to the mobile communication device 100. If the message server 40 later receives from the mobile communication device 100 a notification that a full version of the originally received message is required, as described below, the message server 40 changes its records to reflect that the messages corresponding to the identifiers embedded into the content of the message 15 are not stored on the mobile communication device 100.

Figure 5:
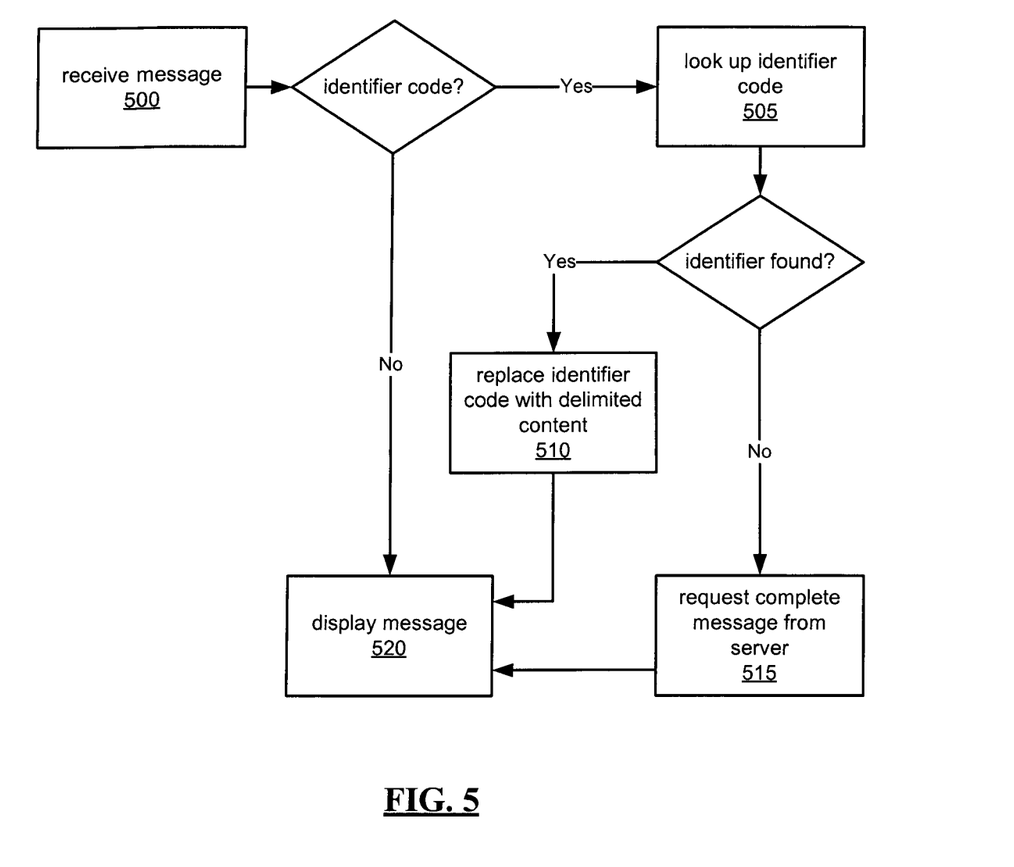
FIG. 5 is a flowchart of a method for receiving and displaying an electronic message.

At the mobile communication device 100, the child message 15, which may be edited as described above, is received at step 500. If the system is configured so that the mobile communication device 100 must compute the hash or otherwise determine the identifier associated with the received message 15, then preferably the hash or other identifier is determined using the same method used at the message server 40, and the hash or other identifier is recorded in a data store on the mobile device 100 once the message is received by the device 100. If the system is configured so that the mobile communication device 100 receives the hash or other identifier from the message server 40 at the same time as the message 15 itself is received, then the identifier may be directly stored in the data store on the mobile device 100. Most preferably, determination and/or storage of the identifier takes place immediately upon receipt of the message at step 500.

After receipt, the mobile communication device 100 is configured to scan the message 15 for any identifying instruction or code that was inserted by the message server 40. If no such identifying instruction or code is found, then the message may be displayed to the user at step 520. If an identifying instruction or code is found, then at step 510 the mobile communication device 100 parses the identifying instruction to isolate the identifier (most preferably the hash value, as described above), and uses the identifier to query a data store on the mobile communication device 100 to locate the corresponding message. If the query is successful and the identifier is found in the data store, then the corresponding message content, and preferably select header information, is retrieved from the data store or message store and inserted into the received message 15, replacing the identifying instruction or identifier. The data store and the message store on the mobile communication device 100, as on the message server 40, may be the same. Preferably, the conventional delimiter indicating replicated parent message content is also inserted so that it precedes the corresponding message content and header information. If more than one identifying instruction is found in the received message 15, this process is repeated.

The received message 15 is then stored with the inserted content, and the previous version of the received message 15 is overwritten or discarded. It is preferable to store the message with inserted content particularly if the user wishes to view the same message more than once; by storing the message with its inserted content, the time required to retrieve the full content of the message is potentially reduced. In an alternate embodiment, the received message 15 is not overwritten in a form containing the inserted content, and is instead stored in the format in which it was received with the identifiers inserted by the server 40. In this alternate embodiment, the mobile communication device 100 would be configured to perform the above operations each time the user views the received message 15. This may allow for more compression of messages on the mobile communication device 100, but potentially slower viewing time as the mobile communication device 100 must reinsert the content each time the message is viewed. However the message 15 is stored in the mobile communication device 100, after the corresponding message content and header is inserted, the message may be displayed to the user at step 520.

If the identifier is not found in the data store by the mobile communication device 100, then the mobile device 100 transmits a request to the message server 40 for the missing portions of the message. The request may comprise the identifier associated with the missing portion, in which case the server 40 may respond by transmitting the missing portion only. Alternatively, the request may comprise the identifier associated with the received message 15, in which case the server 40 may respond by transmitting the entire message 15 as originally received at the server 40.

As will be appreciated by those skilled in the art, the system and method described above provides a more efficient means for delivering message content from the message server 40 to the mobile communication device 100. Replicated content that is already stored on the mobile communication device 100 does not need to be transmitted or retransmitted; instead, it is identified by an identifier, so that the mobile communication device 100 can query its own data stores and regenerate the message as originally received by the message server 40 without the need for the message server 40 to transmit the entirety of the originally received message to the mobile communication device 100. Only in those circumstances where the query of the mobile communication device's data stores fails is the entire message transmitted to the mobile device 100.

Thus, for those e-mail messages that contain quoted or replicated parent messages within their content, less bandwidth is consumed in delivering these messages from the message server 40 to the mobile communication device 100. This system does not require that senders outside the message system of message server 40 adopt a new standard for encoding or formatting e-mail messages intended for delivery to the message server 40 or the mobile communication device 100, since the message server 40 and the mobile communication device 100 can recognize conventional delimiters used in the prior art, and most preferably make use of hash values to identify messages rather than relying on optional header fields included with the originally sent messages.

Further, in the preferred embodiment, the mobile communication device 100 selectively displays content to the user according to the delimiters found within the received message body. In the preferred embodiment, e-mail messages of a size greater than a preset minimum (for example, 1K or 2K) are delivered to the mobile communication device 100 in incremental segments or chunks in order to reduce bandwidth usage. Thus, for many messages, only a first segment of the message is initially displayed to the user of the mobile communication device 100; if the user wishes to read more than the first segment, then a request is typically sent to the mail server, which then transmits the next segment or chunk of the message. Additional commands may be provided on the mobile communication device 100 to allow the user to request that the entire remainder of a message be downloaded to the mobile communication device 100, rather than only the next segment.

In the situation where a received message 15 contains a replicated parent message, if the entire message 15 sent to the mobile communication device 100 is longer than the preset minimum, the mobile communication device 100 would not receive the entire message initially. The user, in reviewing the message on the mobile device 100, may therefore lack some necessary context for understanding the content, particularly if the newer content of the received message 15 refers to the content of a replicated message that occurred earlier in the thread of related e-mail messages. Frequently, users reading a new message in a thread of messages are interested in the new content of the new message, plus the immediately previous message in the thread; older messages in the thread are often considered less relevant. In addition, where the new content of a received message 15 is over the preset minimum, it is potentially frustrating for a user to be required to manually request the next segment of the message 15, especially where it turns out that the new content of the message 15 spans more than two segments, since the user would then be required to send yet a further command to download the further segment of the message 15.

It will be appreciated by those skilled in the art that the message server 40, in compressing the message using identifying instructions and identifiers as described above, reduces the number of occurrences where the user of the mobile communication device 100 is required to manually request the next segment of the message 15. In the preferred embodiment, the message server 40 is further configured to optionally transmit the entirety of the new content of the received message 15, whether it is over the preset minimum length or not. Thus, preferably, at step 420, when the message server 40 transmits a message that is a child message to the mobile communication device 100 (with identifying instructions comprising identifiers where possible), the message server 40 packages the message 15 so that it contains the newer content of the message 15, plus either the first replicated parent message contained in the content of the message 15, or the identifying instruction denoting that first replicated parent message, regardless of whether the message thus packaged exceeds the preset minimum length or not. The mobile communication device 100, having received the message 15 at step 500, may therefore display to the user not only the entirety of the newer content of the received message 15, but also the first (i.e., immediately preceding) quoted parent message in order to provide context to the user. If the user wishes to view more of the received message 15, the user may manually invoke a command on the mobile communication device 100 to request the entire original message from the message server 40. If the message server 40 had not found any recognizable delimiters in the message as received by the message server 40, then the message server 40 may package the entire message as received by the server 40 for delivery to the mobile communication device 100. Thus, it will be appreciated that the need for the user to request further message segments is further reduced by ensuring that the first or immediately preceding parent message that is replicated in a message is delivered to the mobile communication device 100 automatically.

This configuration is described as optional in that the option to deliver larger than minimum size segments may be enabled or disabled by the user at the message server 40 or at the mobile communication device 100. The message server 40 may still impose a limit on the size of message segment to be sent to the mobile communication device 100 in any event, for example by setting a limit of 5K or 6K.

The systems and methods disclosed herein are presented only by way of example and are not meant to limit the scope of the invention. Other variations of the systems and methods described above will be apparent to those skilled in the art and as such are considered to be within the scope of the invention. For example, it should be understood by those skilled in the art that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, signal capable of transmission, etc.) that contain instructions for use in execution by a processor to perform the methods' operations and implement the systems described herein.

The computer components, software modules, applications, programs, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

Various embodiments of the present invention having been thus described in detail by way of example, it will be apparent to those skilled in the art that variations and modifications may be made without departing from the invention. The invention includes all such variations and modifications as fall within the scope of the appended claims.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

What is claimed is:

1. A method, comprising:
   receiving an encrypted message at a message server, the encrypted message being encrypted with a key at time of receipt by the message server and the encrypted message comprising new message content and content of a plurality of replicated previous messages following the new message content, the message server being associated with a mobile communication device and the message server storing a copy of each of the plurality of replicated previous messages in a data store;
   the message server decrypting the received encrypted message using the key to obtain an unencrypted message;
   the message server generating a compressed message from the unencrypted message, the compressed message comprising:
   the new message content;
   the content of that one of the plurality of replicated previous messages immediately following the new message content in the unencrypted message; and
   at least one identifier replacing content of the remaining ones of the plurality of replicated previous messages, and
   the message server transmitting the compressed message to the mobile communication device.

2. The method of claim 1, further comprising the message server encrypting the compressed message prior to transmitting it to the mobile communication device.

3. The method of claim 1, wherein the key is a session key.

4. The method of claim 3, further comprising the message server encrypting the compressed message with the same key used to encrypt the received encrypted message prior to transmitting the compressed message to the mobile communication device.

5. The method of claim 1, wherein the compressed message is generated by:
   scanning the unencrypted message for delimiters of the content of each one of the plurality of replicated previous messages to thus locate each of the plurality of replicated previous messages in the unencrypted message;
   for each of the remaining ones of the plurality of replicated previous messages thus located:
   generating a corresponding identifier;
   querying the data store using the corresponding identifier to determine whether that replicated previous message was received by the mobile communication device; and
   if that replicated previous message was received by the mobile communication device, replacing the content of that replicated previous message with the corresponding identifier.

6. The method of claim 1, wherein the at least one identifier is generated from either a hash value derived from a corresponding one of the plurality of previous messages, or is generated from the content of a corresponding one of the plurality of previous messages.

7. The method of claim 1, further comprising generating a new identifier for the new message content and storing the new identifier in association with the new message content in the data store.

8. A system, comprising:
   a message server associated with a mobile communication device, the message server being configured to receive an encrypted message, the encrypted message being encrypted with a key at time of receipt by the message server and the encrypted message comprising new message content and content of a plurality of replicated previous messages following the new message content; and
   a data store storing a copy of each of the plurality of replicated previous messages, the message server being configured to:
   decrypt the received encrypted message using the key to obtain an unencrypted message;
   generate a compressed message from the unencrypted message, the compressed message comprising:
   the new message content;
   the content of that one of the plurality of replicated previous messages immediately following the new message content in the unencrypted message; and at least one identifier replacing content of the remaining ones of the plurality of replicated previous messages, and transmit the compressed message to the mobile communication device.

9. The system of claim 8, wherein the message server is further configured to encrypt the compressed message prior to transmitting it to the mobile communication device.

10. The system of claim 8, wherein the key is a session key.

11. The system of claim 10, wherein the message server is further configured to encrypt the compressed message with the same key used to encrypt the received encrypted message prior to transmitting the compressed message to the mobile communication device.

12. The system of claim 8, wherein the message server is configured to generate the compressed message by:

scanning the unencrypted message for delimiters of the content of each one of the plurality of replicated previous messages to thus locate each of the plurality of replicated previous messages in the unencrypted message;

for each of the remaining ones of the plurality of replicated previous messages thus located:

generating a corresponding identifier;

querying the data store using the corresponding identifier to determine whether that replicated previous message was received by the mobile communication device; and if that replicated previous message was received by the mobile communication device, replacing the content of that replicated previous message with the corresponding identifier.

13. The system of claim 8, wherein the at least one identifier is generated from either a hash value derived from a corresponding one of the plurality of previous messages, or is generated from the content of a corresponding one of the plurality of previous messages.

14. The system of claim 8, wherein the message server is further configured to generate a new identifier for the new message content and store the new identifier in association with the new message content in the data store.

15. A method, comprising:

receiving, by a message server, a message, the message server being associated with a mobile communication device, and being configured to transmit messages exceeding a minimum size in incremental segments to the mobile communication device, the message server storing a copy of each of a plurality of replicated previous messages in a data store, the message comprising new message content and content of a plurality of replicated previous messages following the new message content, either the new message content exceeding the minimum size or the new message content and the content of that one of the plurality of replicated previous messages exceeding the minimum size;

the message server generating a compressed message from the received message, the compressed message comprising:

the new message content; and at least one identifier replacing content of the plurality of replicated previous messages, and the message server transmitting an entirety of a first segment of the compressed message to the mobile communication device even when the first segment exceeds the minimum size, the first segment comprising the new message content and either the content of that one of the plurality of replicated previous messages immediately following the new message content in the received message, or an identifier replacing said content.

16. The method of claim 15, wherein the first segment comprises the new message content and the content of that one of the plurality of replicated previous messages immediately following the new message content.

17. The method of claim 15, wherein the first segment comprises the new message content and the identifier replacing the content of that one of the plurality of replicated previous messages immediately following the new message content.

18. The method of claim 15, wherein the message is received in encrypted form by the message server.

19. The method of claim 18, wherein the message is encrypted by a session key.

20. The method of claim 18, wherein at least the first segment of the compressed message is encrypted before it is transmitted to the mobile communication device.

21. The method of claim 15, wherein the compressed message is generated by:

scanning the received message for delimiters of the content of each one of the plurality of replicated previous messages to thus locate each of the plurality of replicated previous messages in the received message;

for each of the plurality of replicated previous messages thus located:

generating a corresponding identifier;

querying the data store using the corresponding identifier to determine whether that replicated previous message was received by the mobile communication device; and if that replicated previous message was received by the mobile communication device, replacing the content of that replicated previous message with the corresponding identifier.

22. A system, comprising:

a message server associated with a mobile communication device, the message server being configured to transmit messages exceeding a minimum size in incremental segments to the mobile communication device; and a data store storing a copy of each of a plurality of replicated previous messages, the message server being configured to:

receive a message comprising new message content and content of a plurality of replicated previous messages following the new message content, either the new message content exceeding the minimum size or the new message content and the content of that one of the plurality of replicated previous messages exceeding the minimum size;

generate a compressed message from the received message, the compressed message comprising:

the new message content; and at least one identifier replacing content of the plurality of replicated previous messages, and transmit an entirety of a first segment of the compressed message to the mobile communication device even when the first segment exceeds the minimum size, the first segment comprising the new message content and either the content of that one of the plurality of replicated previous messages immediately following the new message content in the received message, or an identifier replacing said content.

23. The system of claim 22, wherein the first segment comprises the new message content and the content of that one of the plurality of replicated previous messages immediately following the new message content.

24. The system of claim 22, wherein the first segment comprises the new message content and the identifier replacing the content of that one of the plurality of replicated previous messages immediately following the new message content.

25. The system of claim 22, wherein the message is received in encrypted form by the message server.

26. The system of claim 25, wherein the message is encrypted by a session key.

27. The system of claim 25, wherein at least the first segment of the compressed message is encrypted before it is transmitted to the mobile communication device.

28. The system of claim 22, wherein the compressed message is generated by:
  scanning the received message for delimiters of the content of each one of the plurality of replicated previous messages to thus locate each of the plurality of replicated previous messages in the received message;
  for each of the plurality of replicated previous messages thus located:
    generating a corresponding identifier;
    querying the data store using the corresponding identifier to determine whether that replicated previous message was received by the mobile communication device; and
    if that replicated previous message was received by the mobile communication device, replacing the content of that replicated previous message with the corresponding identifier.

\* \* \* \* \*